United States Patent
Xu et al.

(10) Patent No.: US 12,459,369 B2
(45) Date of Patent: Nov. 4, 2025

(54) MITIGATION OF MOTOR LINE TO LINE VOLTAGE REVERSAL

(71) Applicant: FORD GLOBAL TECHNOLOGIES, LLC, Dearborn, MI (US)

(72) Inventors: Yang Xu, Canton, MI (US); Ji Wu, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 192 days.

(21) Appl. No.: 18/501,650

(22) Filed: Nov. 3, 2023

(65) Prior Publication Data
US 2025/0145011 A1    May 8, 2025

(51) Int. Cl.
*H02M 1/08* (2006.01)
*B60L 15/00* (2006.01)
*H02M 1/36* (2007.01)
*H02M 1/38* (2007.01)
*H02M 7/5395* (2006.01)
*H02P 27/08* (2006.01)

(52) U.S. Cl.
CPC .......... *B60L 15/007* (2013.01); *H02M 1/36* (2013.01); *H02M 1/38* (2013.01); *H02M 7/5395* (2013.01); *H02P 27/085* (2013.01); *B60L 2240/526* (2013.01)

(58) Field of Classification Search
CPC ........ H02M 1/36; H02M 1/38; H02M 7/5395; H02M 1/12; H02M 1/44; H02P 27/085
See application file for complete search history.

(56) References Cited

U.S. PATENT DOCUMENTS

| | | | |
|---|---|---|---|
| 5,912,813 A | 6/1999 | Kerkman et al. | |
| 7,034,501 B1 | 4/2006 | Thunes et al. | |
| 8,488,345 B2 | 7/2013 | Tallam et al. | |
| 2017/0334294 A1* | 11/2017 | Chen | H02P 27/08 |
| 2020/0343845 A1* | 10/2020 | Zhong | H02P 27/085 |

FOREIGN PATENT DOCUMENTS

EP    3930181 A1    12/2021

OTHER PUBLICATIONS

Mitigation of Motor Overvoltage in SiC-Device-Based Drives Using a Soft-Switching Inverter; Wenzhi Zhou et al; Department of Electrical and Electronic Engineering, University of Bristol, Oct. 2020, ResearchGate, www.researchgate.net/publication/345182968, 9 pages.

(Continued)

*Primary Examiner* — Muhammad S Islam
(74) *Attorney, Agent, or Firm* — David B. Kelley; Brooks Kushman P.C.

(57) ABSTRACT

A changed polarity complement of a first gate duty cycle command for a next cycle of a carrier wave is generated based on the first gate duty cycle command for a current cycle, the first gate duty cycle command for the next cycle, a second gate duty cycle command for the current cycle, and the second gate duty cycle command for the next cycle. A switch of an inverter is operated according to the changed polarity complement of the first gate duty cycle command.

16 Claims, 6 Drawing Sheets

(56) References Cited

OTHER PUBLICATIONS

Reflected Wave Phenomenon in SiC Motor Drives: Consequences, Boundaries, and Mitigation; Balaji Narayanasamy et al.; IEEE Transactions on Power Electronics, vol. 35, No. 10, Oct. 2020, 14 pages.
Mitigation of Motor Overvoltage in SiC-Based Drives using Soft-Switching Voltage Slew-Rate (dv/dt) Profiling; Zhou et al.; IEEE, Loughborough University; www.doi.org/10.1109/tpel.2022.3157395; 2022; 18 pages.
Interaction of Drive Modulation & Cable Parameters on AC Motor Transients; Kerkman et al.; Rockwell Automation—Allen Bradley; 0-7803-3544-9/96 © 1996 IEEE; Oct. 14, 2023, 10 pages.
Voltage Stress Modeling and Measurement for Random-Wound Machine Windings Driven by Inverters; Xie et al.; 0093-9994 © 2020 IEEE; www.ieee.org/publications/rights/index.html; Oct. 14, 2023, 13 pages.
Anti-resonance phenomenon and peak voltage stress within PWM inverter fed stator winding; Sundeep et al.; IEEE Transactions on Industrial Electronics, 68 (12). pp. 11826-11836. ISSN 0278-0046; www.doi.org/10.1109/tie.2020.3048286; 2021, 11 pages.

\* cited by examiner

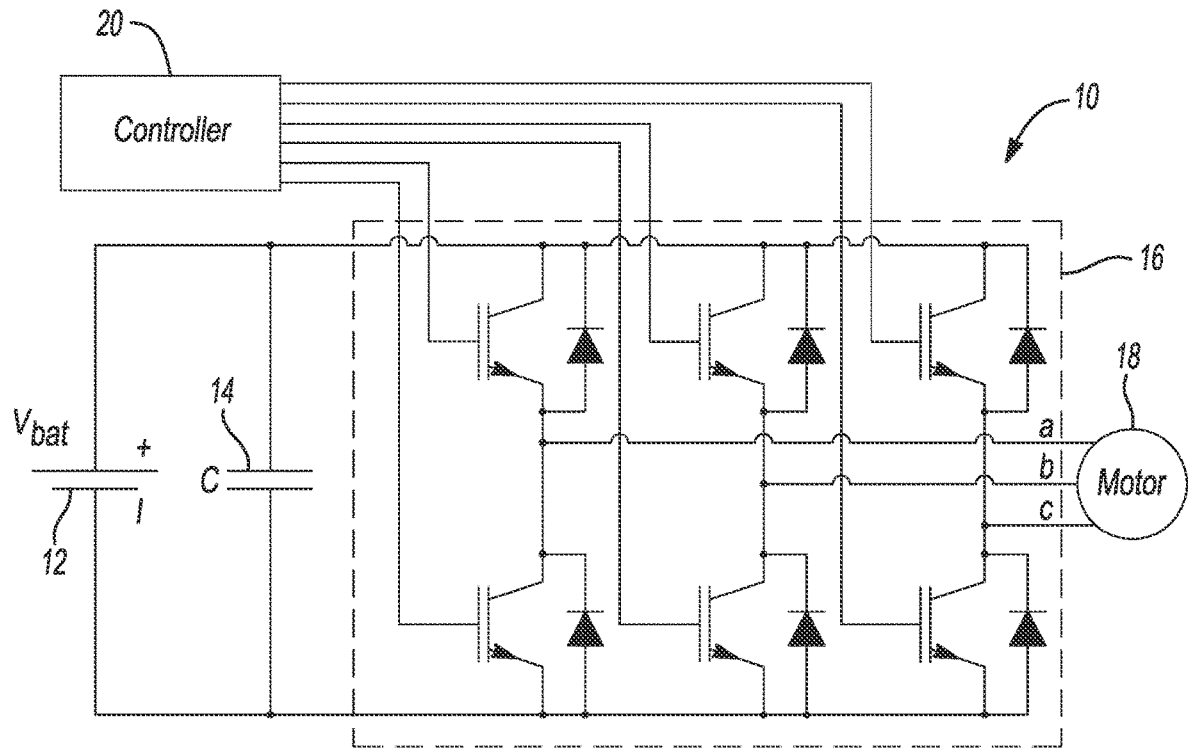
*Fig-1*
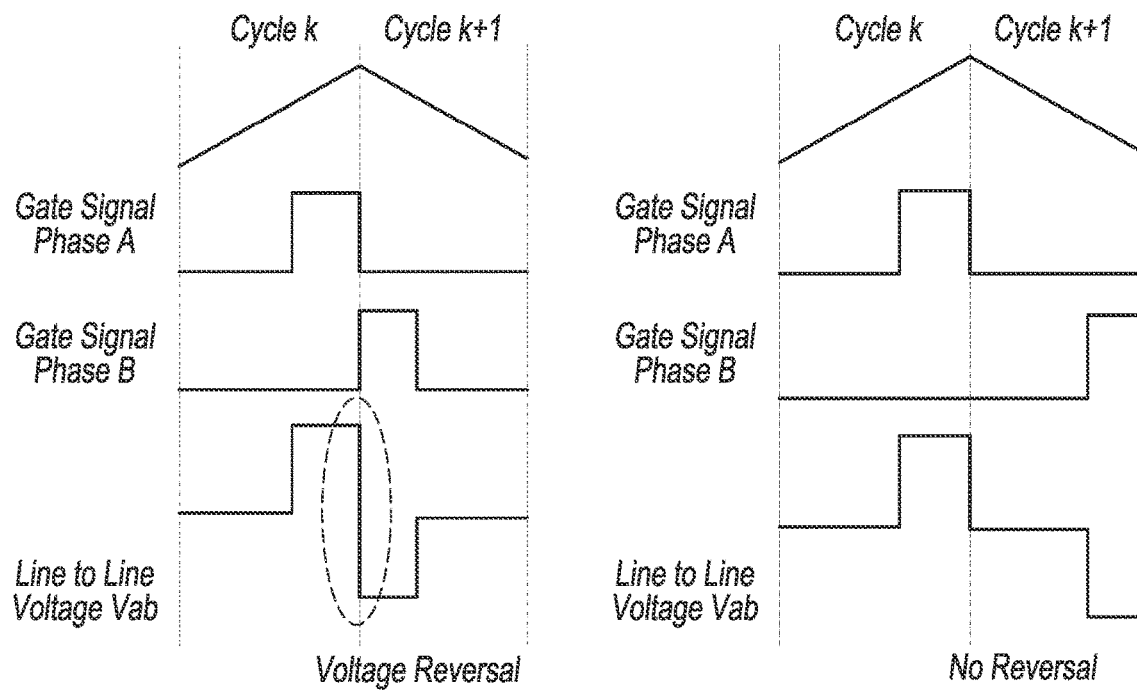
*Fig-3A*      *Fig-3B*

US 12,459,369 B2

MITIGATION OF MOTOR LINE TO LINE VOLTAGE REVERSAL

TECHNICAL FIELD

This disclosure relates to automotive power systems.

BACKGROUND

An automotive vehicle may use electrical energy to power an electric machine. The electric machine may convert this electrical energy to mechanical energy to propel the vehicle. The automotive vehicle may include various power electronics equipment to condition and store the electrical energy.

SUMMARY

An automotive control system includes one or more controllers programmed to, responsive to a carrier wave counting down during a current cycle, a first gate duty cycle command for the current cycle associated with a first phase being 1 and the first gate duty cycle command for a next cycle being less than 1, a second gate duty cycle command for the current cycle associated with a second phase being less than 1 and the second gate duty cycle command for the next cycle being 1, set the first gate duty cycle command for the next cycle equal to a complement of the first gate duty cycle command for the next cycle and change a polarity of the complement of the first gate duty cycle command to generate a changed polarity complement of the first gate duty cycle command, and operate a switch of an inverter according to the changed polarity complement of the first gate duty cycle command during the next cycle.

A method includes generating a changed polarity complement of a first gate duty cycle command for a next cycle based on the first gate duty cycle command for a current cycle, the first gate duty cycle command for the next cycle, a second gate duty cycle command for the current cycle, and the second gate duty cycle command for the next cycle. The method also includes operating a switch of an inverter according to the changed polarity complement of the first gate duty cycle command.

A vehicle includes a traction battery, an electric machine, an inverter electrically connected between the traction battery and electric machine, and one or more controllers. The one or more controllers set a first gate duty cycle command for a next cycle of an asymmetric carrier wave to a predefined value based on the first gate duty cycle command for a current cycle of the asymmetric carrier wave and the next cycle and a second gate duty cycle command for the current and next cycles.

BRIEF DESCRIPTION OF THE DRAWINGS

FIG. 1 is a block diagram of a vehicle.

FIGS. 3A, 5A, and 7A are carrier signal, gate signal, and line to line voltage wave forms (unmodified).

FIGS. 3B, 5B, and 7B are carrier signal, gate signal, and line to line voltage wave forms (modified) via the algorithms of FIGS. 2, 4, and 6, respectively.

DETAILED DESCRIPTION

Figure 2:
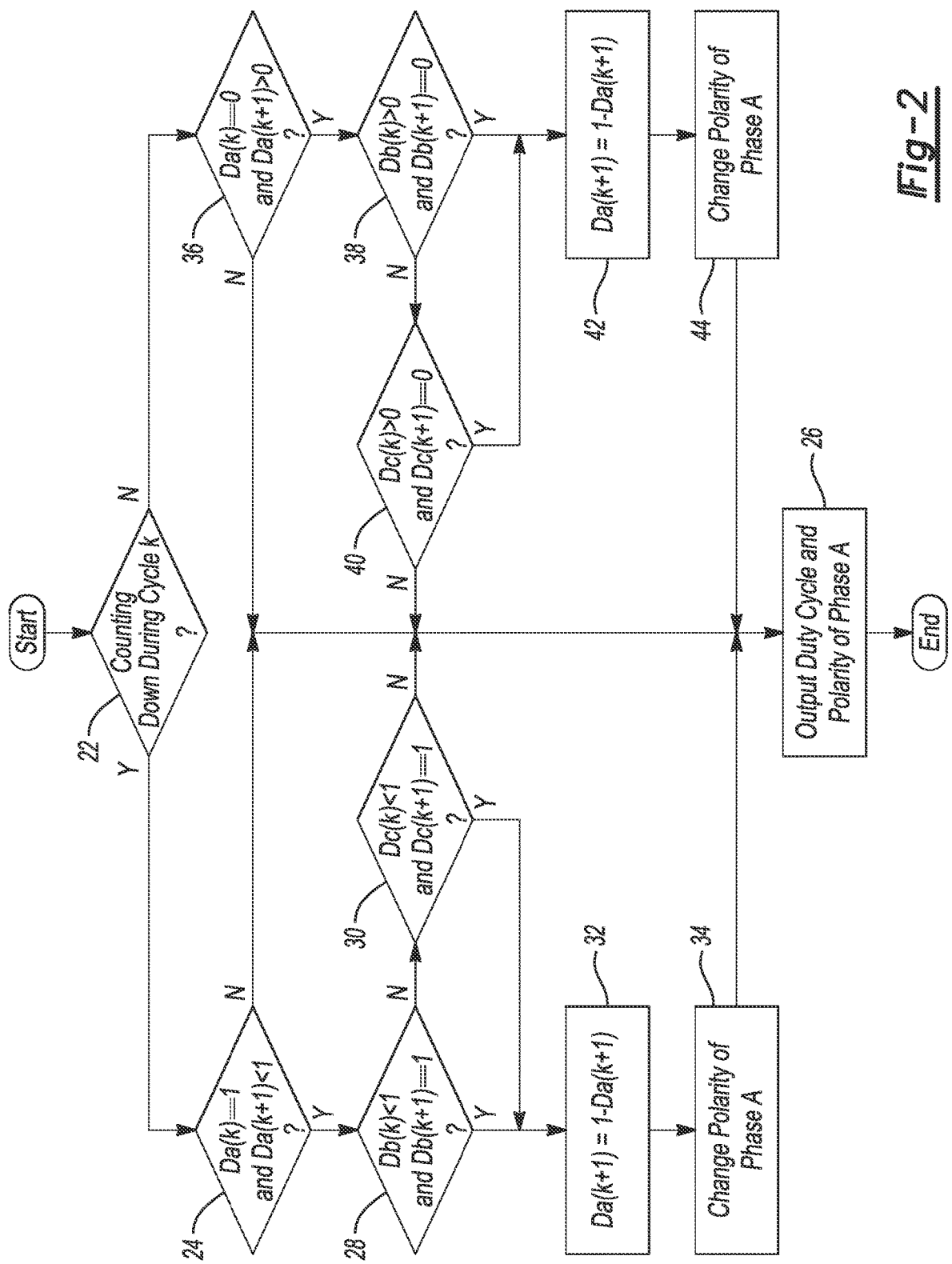
FIGS. 2, 4, and 6 are flow charts of inverter gate control algorithms.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In automotive inverter control systems, pulse-width modulation (PWM) is a fundamental technique used to regulate the voltage or current supplied to electric motors and various devices. At the core of this method lies a high-frequency waveform or carrier signal. This carrier signal acts as a reference signal and often takes the form of a square or triangular wave with a fixed frequency known as the carrier frequency or switching frequency. This determines how frequently the control signal is updated and affects the system's overall performance.

Operating alongside the carrier signal is the modulating signal. This signal represents the desired output voltage or current, varying based on the specific control requirements of the system. For example, in an electric vehicle, it might depict the desired motor speed or torque. The function of the PWM controller is to continuously compare the modulating signal with the carrier signal. This comparison dictates how long the inverter's switching devices, often transistors, should remain in the ON (high) state or the OFF (low) state during each cycle of the carrier signal.

The duty cycle arises as a result of this comparison. The duty cycle indicates the proportion of time during a carrier signal cycle that the PWM signal is in the high state, effectively ON. It reflects the modulating signal's current state; for instance, a high value in the modulating signal corresponds to a high duty cycle. This longer ON duration during the carrier cycle results in a higher average output voltage or current, aligning with the control requirements.

PWM control within the context of automotive applications offers precision. By adjusting the duty cycle continuously based on the modulating signal, the inverter can finely tune the output voltage or current. This level of control is helpful in contexts like electric vehicles, where accurate control of the motor's speed and torque is useful during operation.

The choice of carrier frequency can influence system performance. Higher carrier frequencies lead to smoother output waveforms and control resolution but may increase switching losses. Conversely, lower frequencies can enhance efficiency but might introduce more harmonics into the output, affecting electromagnetic compatibility and potentially requiring additional filtering.

Referring to FIG. 1, a vehicle 10 includes a traction battery 12, a DC link capacitor 14, an inverter 16, an electric machine 18, and one or more controllers 20. The DC link capacitor 14 is electrically connected between the traction battery 12 and inverter 16. The inverter 16 is electrically connected between the DC link capacitor 14 and electric machine 18.

The one or more controllers 20 generate gate signals that determine the turning on and turning off of the switches of the inverter 16, resulting in power flow between the traction battery 12 and electric machine 18. Terminal voltages of the electric machine 18 are controlled as PWM voltages. The gate signals can be generated by comparing the duty ratio with a triangular carrier during every control cycle.

PWM voltages have fast transients. During transition, a ringing effect can be observed. Such ringing may stress insulation of the electric machine 18. The most prominent cases involve voltage transits between −Vdc and +Vdc.

From a physical perspective, a root cause of voltage reversal is when an active voltage vector is used and directly followed by a non-adjacent active voltage vector during state vector PWM. As a result, two phases switch simultaneously and the line to line voltage reverses. In one example, the desired voltage vector goes from one sector to a non-adjacent sector along the edge of the voltage hexagon. A voltage reversal will happen whether counting up or down.

For a practical implementation, the duty cycle command counting up or down may be used to detect the voltage reversal. Voltage reversal happens when the duty cycle and the counting up or down satisfy either of two conditions. The carrier transits from counting up to down, the duty cycle of one phase transits from non-zero to 0, and the duty cycle of another phase transits from 0 to non-zero (Condition 1). The carrier transits from counting down to up, the duty cycle of one phase transits from 1 to less than 1, and the duty cycle of another other phase transits from less than 1 to 1 (Condition 2).

The polarity of the PWM can be changed when either Condition 1 or 2 is met as voltage reversal is about to happen. This allows for a falling edge during counting down and a rising edge during counting up. The duty cycle command can be flipped so the average voltage during one control cycle does not change. The voltage reversal is thus avoided, the average voltage during one control cycle remains the same, and voltage distortion is minimal.

For each of the following algorithms, which can be implemented by the one or more controllers 20, duty cycle commands for each phase are first calculated using known motor control technologies.

Referring to FIG. 2, at operation 22 it is determined whether the carrier signal is counting down during cycle k. If yes, at operation 24 it is determined whether the duty cycle of phase A during cycle k, Da(k), is 1 and the duty cycle of phase A during cycle k+1, Da(k+1), will be less than 1. If no, at operation 26 the duty cycle and polarity of phase A is output to the inverter 16. If yes, at operation 28 it is determined whether the duty cycle of phase B during cycle k, Db(k), is less than 1 and the duty cycle of phase B during cycle k+1, Db(k+1), will be 1. If no, at operation 30 it is determined whether the duty cycle of phase C during cycle k, Dc(k), is less than 1 and the duty cycle of phase C during cycle k+1, Dc(k+1), will be 1. If no, the algorithm proceeds to operation 26. If yes, at operation 32 Da(k+1) is set equal to (1−Da(k+1)), which is its complement. At operation 34, the polarity of (1−Da(k+1)) is changed. The algorithm then proceeds to operation 26. Returning to operation 28, if yes, the algorithm proceeds to operation 32.

Referring to operation 22, if no, at operation 36 it is determined whether Da(k) is 0 and Da(k+1) will be greater than 0. If no, the algorithm proceeds to operation 26. If yes, at operation 38 it is determined whether Db(k) is greater than 0 and Db(k+1) will be 0. If no, at operation 40 it is determined whether Dc(k) is greater than 0 and Dc(k+1) will be 0. If no, the algorithm proceeds to operation 26. If yes, at operation 42 Da(k+1) is set equal to (1−Da(k+1)). At operation 44, the polarity of (1−Da(k+1)) is changed. The algorithm then proceeds to operation 26. Returning to operation 38, if yes, the algorithm proceeds to operation 42.

The above algorithm is then performed for phase B and phase C. For phase B, references to Da are replaced with Db (e.g., Da(k+1) is replaced with Db(k+1)), references to Db are replaced with Dc (e.g., Db(k) is replaced with Dc(k)), and references to Dc are replaced with Da (e.g., Dc(k+1) is replaced with Da(k+1)). For phase C, references to Da are replaced with Dc, references to Db are replaced with Da, and references to Dc are replaced with Db.

Referring to FIG. 3A, assuming the gate signal for phase C is 0 during cycle k and cycle k+1, the carrier signal, gate signal for phase A, gate signal for phase B, and resulting line to line voltage Vab with reversal are shown without using the algorithm of FIG. 2. These are the duty cycle commands for each phase first calculated using known motor control technologies.

Referring to FIG. 3B, assuming the gate signal for phase C is 0 during cycle k and cycle k+1, the carrier signal, gate signal for phase A, gate signal for phase B (modified as a result of the algorithm of FIG. 2), and resulting line to line voltage Vab without reversal are shown. The modified gate signal for phase B results in this example from performing operations 22, 36, 40, 42, 44 while checking phase B.

For symmetric PWM applications, the polarity of the PWM is changed when a potential voltage reversal is detected to allow for a falling edge during counting down and a rising edge during counting up. The duty cycle command is also flipped so the average voltage during one control cycle does not change. The voltage reversal is thus avoided, the average voltage during one control cycle remains the same, and voltage distortion is minimal.

Figure 4:
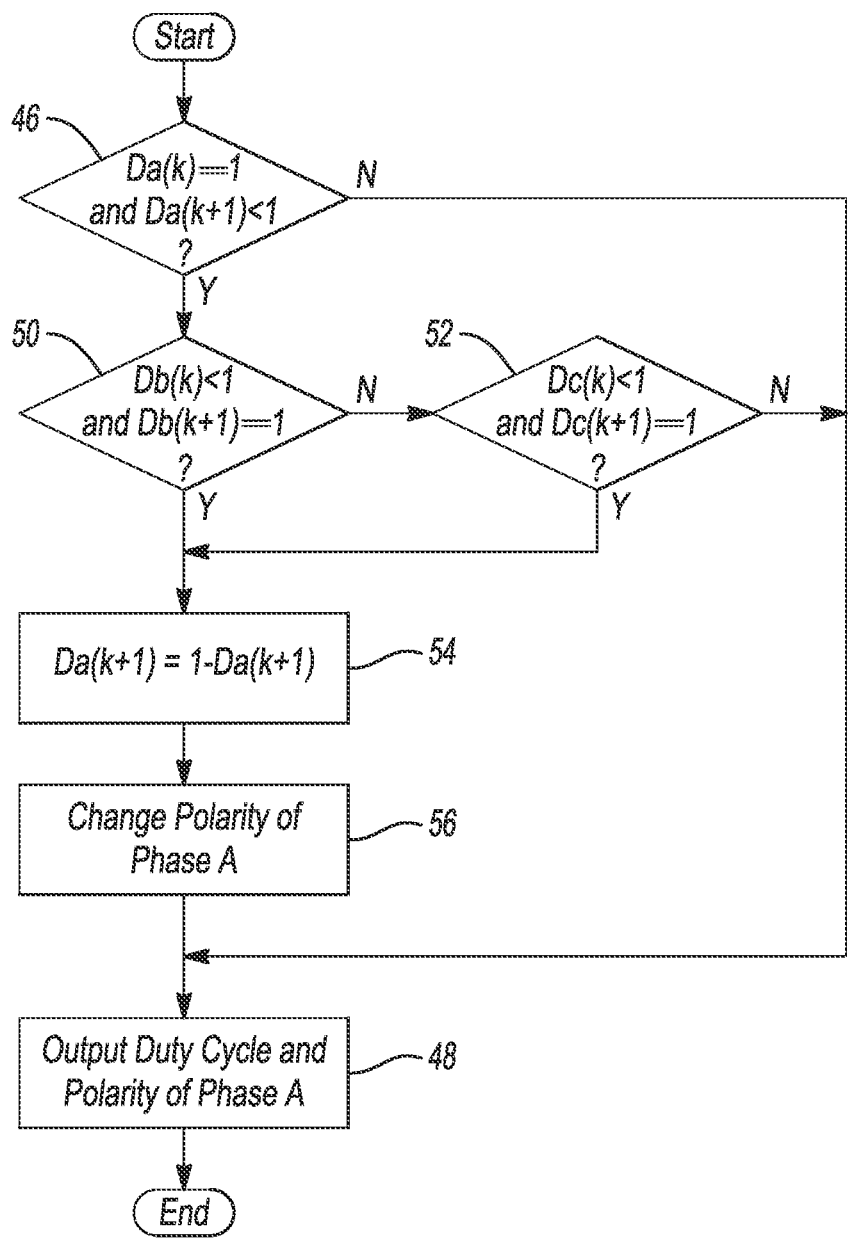

Referring to FIG. 4 (and assuming symmetrical PWM is used), at operation 46 it is determined whether Da(k) is 1 and Da(k+1) will be less than 1. If no, at operation 48 the duty cycle command for phase A first calculated using known motor control technologies is output to the inverter 16. If yes, at operation 50 it is determined whether Db(k) is less than 1 and Db(k+1) will be 1. If no, at operation 52 it is determined whether Dc(k) is less than 1 and Dc(k+1) will be 1. If no, the algorithm proceeds to operation 48. If yes, at operation 54 Da(k+1) is set equal to (1−Da(k+1)). At operation 56, the polarity of (1−Da(k+1)) is changed. The algorithm then proceeds to operation 48. Returning to operation 50, if yes, the algorithm proceeds to operation 54.

The above algorithm is then performed for phase B and phase C. For phase B, references to Da are replaced with Db, references to Db are replaced with Dc, and references to Dc are replaced with Da. For Phase C, references to Da are replaced with Dc, references to Db are replaced with Da, and references to Dc are replaced with Db.

Figure 5B:
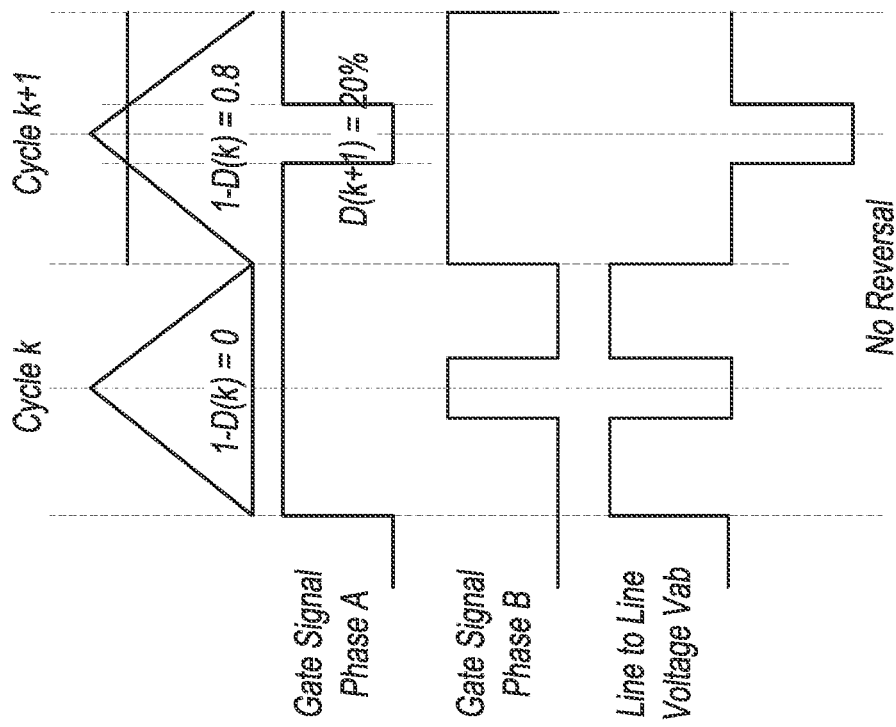
Figure 5A:
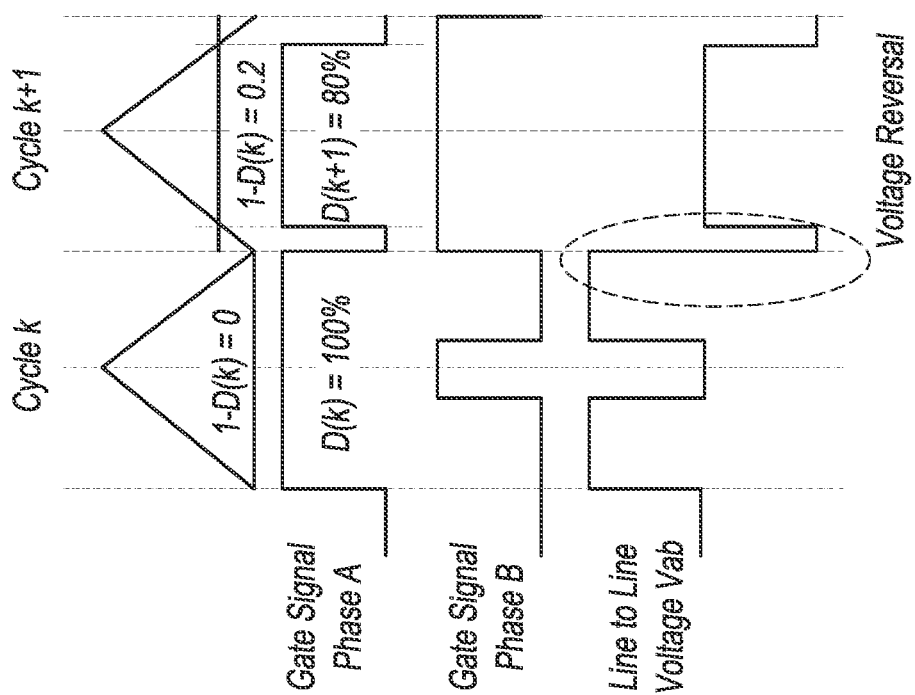

Referring to FIG. 5A, assuming the gate signal for phase C is 0 during cycle k and cycle k+1, the carrier signal, gate signal for phase A, gate signal for phase B, and resulting line to line voltage Vab with reversal are shown without using the algorithm of FIG. 4. These are the duty cycle commands for each phase first calculated using known motor control technologies.

Referring to FIG. 5B, assuming the gate signal for phase C is 0 during cycle k and cycle k+1, the carrier signal, gate signal for phase A (modified as a result of the algorithm of FIG. 4), gate signal for phase B, and resulting line to line voltage Vab without reversal are shown. The modified gate signal for phase A results in this example from performing operations 46, 50, 54, 56 while checking phase A.

When condition 1 is met and thus voltage reversal is about to happen, the minimum duty cycle command can be limited to above 0. When condition 2 is met and thus voltage reversal is about to happen, the maximum duty cycle command can be limited to below 1.

Figure 6:
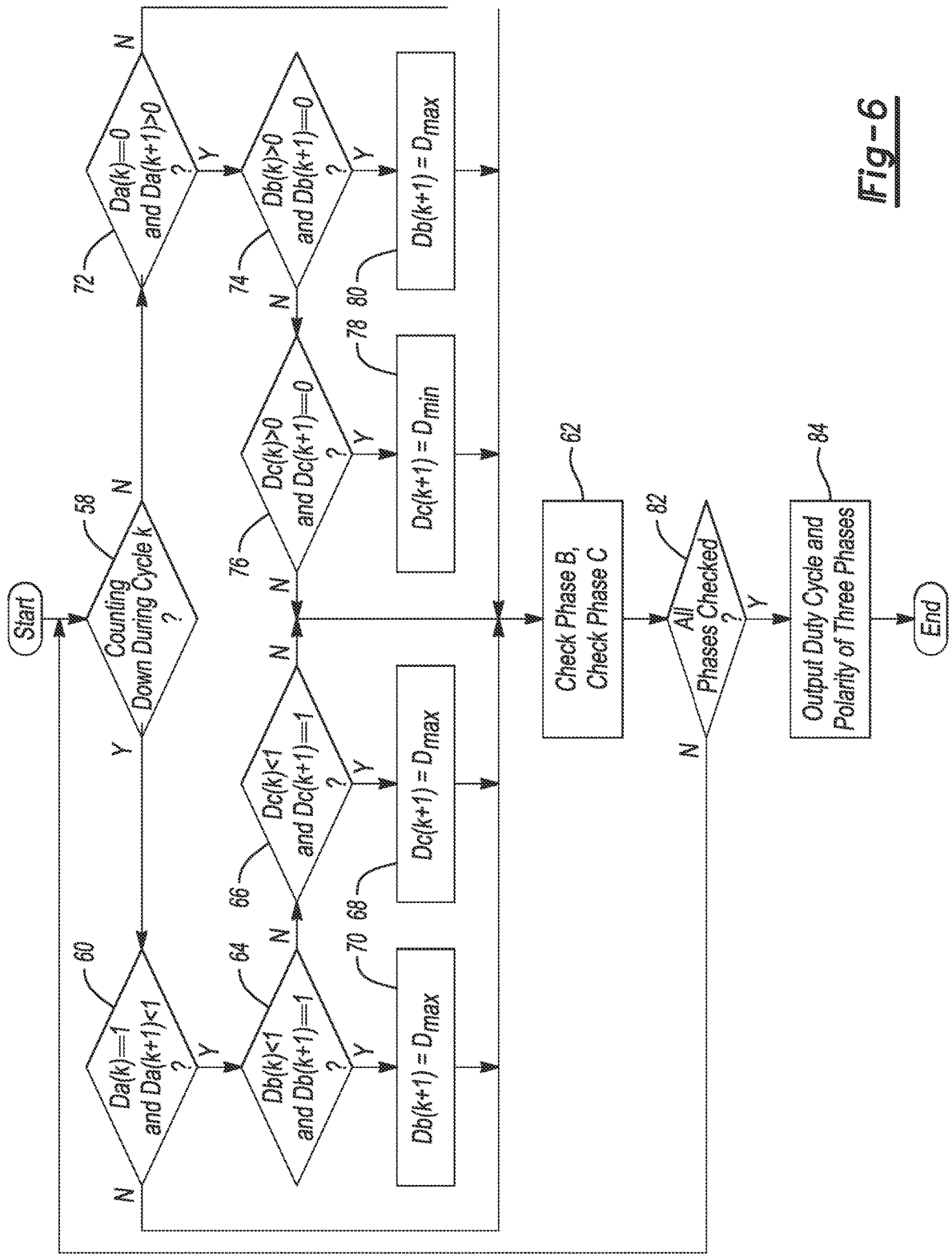

Referring to FIG. 6, at operation 58, it is determined whether the carrier signal is counting down during cycle k. If yes, at operation 60 it is determined whether Da(k) is 1 and Da(k+1) will be less than 1. If no, phase B is checked at operation 62. If yes, at operation 64 it is determined whether Db(k) is less than 1 and Db(k+1) will be 1. If no, at operation 66 it is determined whether Dc(k) is less than 1 and Dc(k+1) will be 1. If no, the algorithm proceeds to operation 62. If yes, Dc(k+1) is set to a predetermined maximum value at operation 68. The algorithm then proceeds to operation 62. Returning to operation 64, if yes Db(k+1) is set to a predetermined maximum value at operation 70. The algorithm the proceeds to operation 62. The predetermined values can be determined via testing, simulation, etc. and may depend on system design and characteristics.

After operation 62, it is determined whether all phases have been checked. If no, the algorithm returns to operation 58. If yes, at operation 84 the duty cycle and polarity of the three phases are output to the inverter 16.

Returning to operation 58, if no, at operation 72 it is determined whether Da(k) is 0 and Da(k+1) will be greater than 0. If no, phase B is checked at operation 62. If yes, at operation 74 it is determined whether Db(k) is greater than 0 and Db(k+1) will be 0. If no, at operation 76 it is determined whether Dc(k) is greater than 0 and Dc(k+1) will be 0. If no, the algorithm proceeds to operation 62. If yes, Dc(k+1) is set to a predetermined minimum value at operation 78. The algorithm then proceeds to operation 62. Returning to operation 74, if yes Db(k+1) is set to a predetermined minimum value at operation 80. The algorithm the proceeds to operation 62.

For checking phase B, references to Da are replaced with Db, references to Db are replaced with Dc, and references to Dc are replaced with Da. For checking phase C, references to Da are replaced with Dc, references to Db are replaced with Da, and references to Dc are replaced with Db.

Figure 7B:
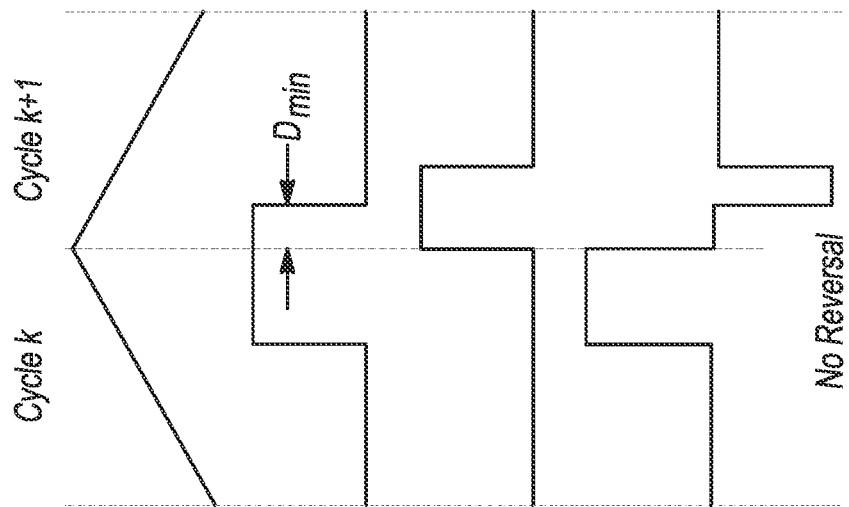
Figure 7A:
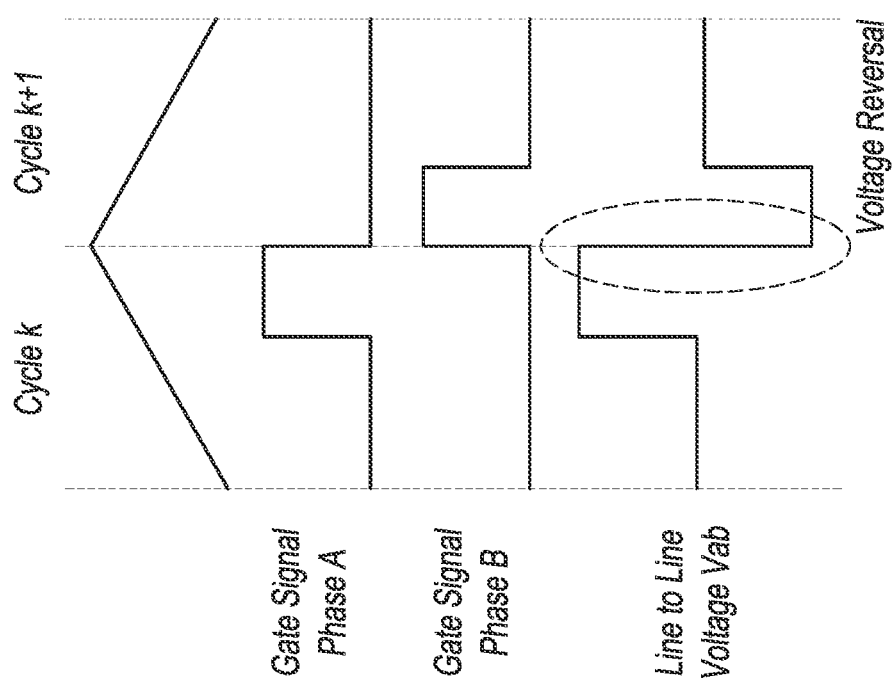

Referring to FIG. 7A, assuming the gate signal for phase C is 1 during cycle k and cycle k+1, the carrier signal, gate signal for phase A, gate signal for phase B, and resulting line to line voltage Vab with reversal are shown without using the algorithm of FIG. 6. These are the duty cycle commands for each phase first calculated using known motor control technologies.

Referring to FIG. 7B, assuming the gate signal for phase C is 1 during cycle k and cycle k+1, the carrier signal, gate signal for phase A (modified as a result of the algorithm of FIG. 6), gate signal for phase B, and resulting line to line voltage Vab without reversal are shown. The modified gate signal for phase A results in this example from performing operations 72, 74, 76, 78 while checking phase B.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims.

The words used in the specification are words of description rather than limitation, and it is understood that various changes may be made without departing from the spirit and scope of these disclosed materials. The terms "controller" and "controllers," for example, can be used interchangeably herein as the functionality of a controller can be distributed across several controllers/modules, which may all communicate via standard techniques.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An automotive control system comprising:
one or more controllers programmed to, responsive to a carrier wave counting down during a current cycle, a first gate duty cycle command for the current cycle associated with a first phase being 1 and the first gate duty cycle command for a next cycle being less than 1, and a second gate duty cycle command for the current cycle associated with a second phase being less than 1 and the second gate duty cycle command for the next cycle being 1, set the first gate duty cycle command for the next cycle equal to a complement of the first gate duty cycle command for the next cycle and change a polarity of the complement of the first gate duty cycle command to generate a changed polarity complement of the first gate duty cycle command, and operate a switch of an inverter according to the changed polarity complement of the first gate duty cycle command during the next cycle.

2. The automotive control system of claim 1, wherein the one or more controllers are further programmed to, responsive to the carrier wave counting down during the current cycle, the first gate duty cycle command for the current cycle being 1 and the first gate duty cycle command for the next cycle being less than 1, the second gate duty cycle command for the current cycle being less than 1 and the second gate duty cycle command for the next cycle being less than 1, and a third gate duty cycle command for the current cycle associated with a third phase being less than 1 and the third gate duty cycle command for the next cycle being 1, generate the changed polarity complement of the first gate duty cycle command and operate the switch according to the changed polarity complement of the first gate duty cycle command during the next cycle.

3. The automotive control system of claim 1, wherein the one or more controllers are further programmed to, responsive to the carrier wave counting up during the current cycle, the first gate duty cycle command for the current cycle being 0 and the first gate duty cycle command for the next cycle being greater than 0, and the second gate duty cycle command for the current cycle being greater than 0 and the second gate duty cycle command for the next cycle being 0, generate the changed polarity complement of the first gate duty cycle command and operate the switch of the inverter according to the changed polarity complement of the first gate duty cycle command during the next cycle.

4. The automotive control system of claim 3, wherein the one or more controllers are further programmed to, responsive to the carrier wave counting up during the current cycle, the first gate duty cycle command for the current cycle being 0 and the first gate duty cycle command for the next cycle being greater than 0, the second gate duty cycle command for the current cycle being greater than 0 and the second gate duty cycle command for the next cycle being greater than 0, and a third gate duty cycle command for the current cycle associated with a third phase being greater than 0 and the third gate duty cycle command for the next cycle being 0, generate the changed polarity complement of the first gate duty cycle command, and operate the switch according to the changed polarity complement of the first gate duty cycle command during the next cycle.

5. The automotive control system of claim 1, wherein the carrier wave is asymmetric.

6. The automotive control system of claim 1, wherein the carrier wave is symmetric.

7. A method comprising:
generating a changed polarity complement of a first gate duty cycle command for a next cycle based on the first gate duty cycle command for a current cycle, the first gate duty cycle command for the next cycle, a second gate duty cycle command for the current cycle, and the second gate duty cycle command for the next cycle; and operating a switch of an inverter according to the changed polarity complement of the first gate duty cycle command.

8. The method of claim 7, wherein the generating is further based on a third gate duty cycle command for the current and next cycles.

9. The method of claim 8, wherein the generating is further based on whether the third gate duty cycle command for the current cycle is less than 1 and the third gate duty cycle command for the next cycle is 1.

10. The method of claim 7, wherein the generating is further based on whether the first gate duty cycle command for the current cycle is 1 and the first gate duty cycle command for the next cycle is less than 1.

11. The method of claim 7, wherein the generating is further based on whether the second gate duty cycle command for the current cycle is less than 1 and the second gate duty cycle command for the next cycle is 1.

12. The method of claim 7, wherein a carrier wave defining the current and next cycles is symmetric.

13. A vehicle comprising:
a traction battery;
an electric machine;
an inverter electrically connected between the traction battery and electric machine; and
one or more controllers programmed to set a first gate duty cycle command for a next cycle of an asymmetric carrier wave to a predefined value based on the first gate duty cycle command for a current cycle of the asymmetric carrier wave and the next cycle and a second gate duty cycle command for the current and next cycles.

14. The vehicle of claim 13, wherein the one or more controllers are further programmed to set the first gate duty cycle command for the next cycle to the predefined value based on a third gate duty cycle command for the current and next cycles.

15. The vehicle of claim 13, wherein the predefined value is a maximum value.

16. The vehicle of claim 13, wherein the predefined value is a minimum value.

* * * * *